US012762439B2

(12) United States Patent
Latapie et al.

(10) Patent No.: US 12,762,439 B2
(45) Date of Patent: Oct. 13, 2026

(54) SEMANTIC COMPRESSION IN A SENSOR SYSTEM

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 713 days.

(21) Appl. No.: 17/408,979

(22) Filed: Aug. 23, 2021

(65) Prior Publication Data

US 2023/0059673 A1 Feb. 23, 2023

(51) Int. Cl.

| | |
|---|---|
| ***G06N 5/045*** | (2023.01) |
| ***G06N 3/006*** | (2023.01) |
| ***G06N 5/022*** | (2023.01) |
| ***G06V 10/764*** | (2022.01) |
| ***G06V 20/40*** | (2022.01) |
| ***G06V 20/52*** | (2022.01) |

(52) U.S. Cl.

CPC ............ *G06N 5/045* (2013.01); *G06N 5/022* (2013.01); *G06V 20/41* (2022.01); *G06N 3/006* (2013.01); *G06V 10/764* (2022.01); *G06V 20/44* (2022.01); *G06V 20/52* (2022.01)

(58) Field of Classification Search

CPC ........ G06N 5/045; G06N 5/022; G06N 3/006; G06V 20/41; G06V 20/44; G06V 10/764; G06V 20/52

See application file for complete search history.

(56) References Cited

U.S. PATENT DOCUMENTS

| | | | | |
|---|---|---|---|---|
| 10,887,197 | B2 | 1/2021 | Fenoglio et al. | |
| 10,893,296 | B2 * | 1/2021 | Natanzon | G06V 20/188 |
| 10,965,516 | B2 | 3/2021 | Fenoglio et al. | |
| 11,010,689 | B2 | 5/2021 | Eck et al. | |
| 2016/0239755 | A1 | 8/2016 | Aggour et al. | |
| 2019/0034814 | A1 | 1/2019 | Amer et al. | |
| 2019/0114339 | A1 | 4/2019 | Mineev et al. | |
| 2019/0325060 | A1 | 10/2019 | Fenoglio et al. | |
| 2021/0012216 | A1 * | 1/2021 | Giovannini | G06V 10/768 |

(Continued)

OTHER PUBLICATIONS

Liu, Tiecheng, and John R. Kender. "Time-constrained dynamic semantic compression for video indexing and interactive searching." Proceedings of the 2001 IEEE Computer Society Conference on Computer Vision and Pattern Recognition. CVPR 2001. vol. 2. IEEE, 2001. (Year: 2001).*

(Continued)

*Primary Examiner* — Sherrod L Keaton
*Assistant Examiner* — Nicholas S Wu
(74) *Attorney, Agent, or Firm* — Lee & Hayes, P.C.

(57) ABSTRACT

In one embodiment, a device makes an inference about an event indicated by sensor data from a plurality of sources by applying a semantic reasoning engine to the sensor data. The device receives a selected semantic compression level from a user interface. The device selects a subset of the sensor data based on the inference and on the selected semantic compression level. The device exports the subset of the sensor data and the inference made by the semantic reasoning engine about the event.

20 Claims, 11 Drawing Sheets

(56) References Cited

U.S. PATENT DOCUMENTS

| | | | |
|---|---|---|---|
| 2021/0042532 A1 | 2/2021 | Latapie et al. |
| 2021/0174155 A1 | 6/2021 | Smith et al. |
| 2021/0279615 A1 | 9/2021 | Latapie et al. |
| 2021/0390423 A1 | 12/2021 | Latapie et al. |

OTHER PUBLICATIONS

Ramirez-Amaro, Karinne, Michael Beetz, and Gordon Cheng. "Automatic segmentation and recognition of human activities from observation based on semantic reasoning." 2014 IEEE/RSJ International Conference on Intelligent Robots and Systems. IEEE, 2014. (Year: 2014).*

Greco, Luca, et al. "IoT and semantic web technologies for event detection in natural disasters." Concurrency and Computation: Practice and Experience 30.21 (2018): e4789. (Year: 2018).*

Steenwinckel, Bram, et al. "Flags: A methodology for adaptive anomaly detection and root cause analysis on sensor data streams by fusing expert knowledge with machine learning." Future Generation Computer Systems 116 (2021): 30-48. (Year: 2021).*

Zheng, Zengwei, et al. "An efficient preference-based sensor selection method in Internet of Things." IEEE Access 7 (2019): 168536-168547. (Year: 2019).*

Dos Santos, Matheus M., et al. "Underwater sonar and aerial images data fusion for robot localization." 2019 19th International Conference on Advanced Robotics (ICAR). IEEE, 2019. (Year: 2019).*

Park N, Kan A, Dong XL, Zhao T, Faloutsos C. Estimating node importance in knowledge graphs using graph neural networks. InProceedings of the 25th ACM SIGKDD international conference on knowledge discovery & data mining Jul. 25, 2019 (pp. 596-606). (Year: 2019).*

Halilaj L, Dindorkar I, Lüttin J, Rothermel S. A knowledge graph-based approach for situation comprehension in driving scenarios. InEuropean Semantic Web Conference May 31, 2021 (pp. 699-716). Cham: Springer International Publishing. (Year: 2021).*

Taylor, Kerry, and Lucas Leidinger. "Ontology-driven complex event processing in heterogeneous sensor networks." Extended semantic web conference. Berlin, Heidelberg: Springer Berlin Heidelberg, 2011. (Year: 2011).*

Santipantakis, Georgios, Konstantinos I. Kotis, and George A. Vouros. "Ontology-based data integration for event recognition in the maritime domain." Proceedings of the 5th International Conference on Web Intelligence, Mining and Semantics. 2015. (Year: 2015).*

Halilaj L, Dindorkar I, Lüttin J, Rothermel S. A knowledge graph-based approach for situation comprehension in driving scenarios. InEuropean Semantic Web Conference May 31, 2021 (pp. 699-716). Cham: Springer International Publishing. (Year: 2021) (Year: 2021).*

Steenwinckel, Bram, et al. "Flags: A methodology for adaptive anomaly detection and root cause analysis on sensor data streams by fusing expert knowledge with machine learning." Future Generation Computer Systems 116 (2021): 30-48. (Year: 2021) (Year: 2021).*

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

De Bono, Edward, "The Mechanism of Mind", 1967, 276 pages, Penguin Books.

Duntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

Gärdenfors, Peter, "Conceptual Spaces: The Geometry of Thought", 2000, 398 pages, MIT Press.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Johnson, Mark, "The Body in The Mind", 1987, 268 pages, The University of Chicago Press.

Kiryati, et al., "A probabilistic Hough transform", Pattern Recognition. 24(4), 1991, pp. 303-316, The Pattern Recognition Society.

Korzybski, Alfred, "Manhood Of Humanity, The Science and Art of Human Engineering", 1921, 240 pages, E. P. Dutton & Company, New York, NY.

Korzybski, Alfred, "Science and Sanity: An Introduction to Non-Aristotelian Systems and General Semantics", 5th Edition, 1994, 910 pages, Institute of General Semantics, New York, NY.

(56) References Cited

OTHER PUBLICATIONS

Korzybski, Alfred, "Videos—This Is Not That", online: https://www.thisisnotthat.com/korzybski-videos/, accessed Nov. 18, 2021, 7 pages.
Lakoff, G., "Women, Fire, and Dangerous Things", 1984, 631 pages, University of Chicago Press.
Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.
Li, et al., "Concept learning via granular computing: A cognitive viewpoint", Information Sciences 298 (2015), Published Dec. 2014, pp. 447-467, Elsevier Inc.
Lieto, et al., "Conceptual Spaces for Cognitive Architectures: A Lingua Franca for Different Levels of Representation", Biologically Inspired Cognitive Architectures 19, May 2017, 17 pages, Cognitive Robotics and Social Sensing Lab.
Ma, et al., "Granular computing and Dual Galois Connection", Information Sciences, 177(23), 2007, pp. 5365-5377, Elsevier Inc.
Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages,.
Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.
Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.
Pauli, Wolfgang, "Part I. General: (A) theory. Some relations between electrochemical behaviour and the structure of colloids", Jan. 1935, pp. 11-27, Transactions of the Faraday Society, vol. 1.
Scarselli, et al., "The Graph Neural Network Model", IEEE Transactions on Neural Networks (vol. 20, Issue: 1, Jan. 2009), pp. 61-80, IEEE.
Searle, John R., "The Rediscovery of the Mind", 1992, 104 pages, MIT Press.
Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.
Swanson, Bret, "The Exponential Internet", online: https://www.uschamberfoundation.org/bhq/exponential-internet, accessed Nov. 19, 2021, 8 pages, The U.S. Chamber of Commerce Foundation.
Tan, et al., "EfficientDet: Scalable and Efficient Object Detection", online: https://arxiv.org/pdf/1911.09070.pdf, Jul. 2020, 10 pages.
Taylor, J. G., "Codam: A neural network model of consciousness", Neural Networks 20 (2007), pp. 983-992, Elsevier Ltd.
Taylor, J. G., "William James on Consciousness Beyond the Margin", 1996, 231 pages, Princeton University Press.
Thórisson, et al., "Cumulative Learning", Artificial General Intelligence—12th International Conference, AGI 2019, Proceedings, pp. 198-208, Springer.
Thórisson, Kristinn R., "A New Constructivist AI: From Manual Methods to Self-Constructive Systems", Chapter 9, Apr. 2012, pp. 147-174, Atlantis Press Book.
Thórisson, Kristinn R., "Integrated AI Systems", Minds & Machines 17, Mar. 2007, pp. 11-25.
Tonioni, et al., "Product recognition in store shelves as a sub-graph isomorphism problem", online: https://arxiv.org/abs/1707.08378, Sep. 2017, 14 pages.
Unger, et al., "The Singular Universe and the Reality of Time: A Proposal in Natural Philosophy", 2015, 558 pages, Cambridge University Press.
Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.
Wang, et al., "Concept Analysis via Rough Set and AFS Algebra", Information Sciences 178 (2008), pp. 4125-4137, Elsevier Inc.
Wang, Pei, "Experience-grounded semantics: a theory for intelligent systems", Aug. 2004, 33 pages, Elsevier Science.
Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).
Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.
Wang, Pei, "On Defining Artificial Intelligence", Journal of Artificial General Intelligence 10(2) 2019, pp. 1-37, Sciendo.
Wang, Pei, "Rigid Flexibility—The Logic of Intelligence", Draft for Comment, Feb. 8, 2004, 329 pages, mindspring.com.
Wang, et al. "Self in NARS, an AGI System", vol. 5, Article 20, Mar. 2018, 15 pages, Frontiers in Robotics and AI.
Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.
Wikipedia, "Wheat and chessboard problem", online: https://en.wikipedia.org/wiki/Wheat_and_chessboard_problem, Oct. 2021, 5 pages, Wikimedia Foundation, Inc.
Wille, Rudolf, "Restructuring Lattice Theory: An Approach Based on Heirarchies of Concepts", I. Rival (Ed.), Ordered Sets, 1982, pp. 314-339.
Yao, et al., "A Granular Computing Paradigm for Concept Learning", Emerging Paradigms in Machine Learning, Springer, London, pp. 307-326, 2012.
Yao, Y. Y., "Information Granulation and Rough Set Approximation", International Journal of Intelligent Systems, vol. 16, No. 1, 87-104, 2001.
Yao, Y. Y., "Integrative levels of granularity", Human-Centric Information Processing Through Granular Modelling, 2009, 20 pages, Studies in Computational Intelligence, vol. 182. Springer, Berlin, Heidelberg.
Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.
Zhou, et al., "Graph neural networks: A review of methods and applications", AI Open, 2020, pp. 57-81, Elsevier B.V.
Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

SEMANTIC COMPRESSION IN A SENSOR SYSTEM

TECHNICAL FIELD

The present disclosure relates generally to computer networks, and, more particularly, to semantic compression in a sensor system.

The amount of data that needs to be stored in the data lake for a system that assesses multimodal timeseries data can grow to be quite large. For instance, the various sensors on board a ship can easily generate data exceeding 50 petabytes, or more, over a relatively limited amount of time. A key observation is that the sensor data for many events are extremely similar to one another, leading to the potential to compress the data lake. For instance, consider an event associated with people crowded on the deck of the ship. Here, there may be dozens of video feeds of this event at different angles, microphone data from various locations, etc. However, it is not really necessary to present an administrator with all of this sensor data, to convey information about the event to them. Indeed, the administrator may only need to review highlights of events for a given time period (e.g., representative video frames that summarize the events, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
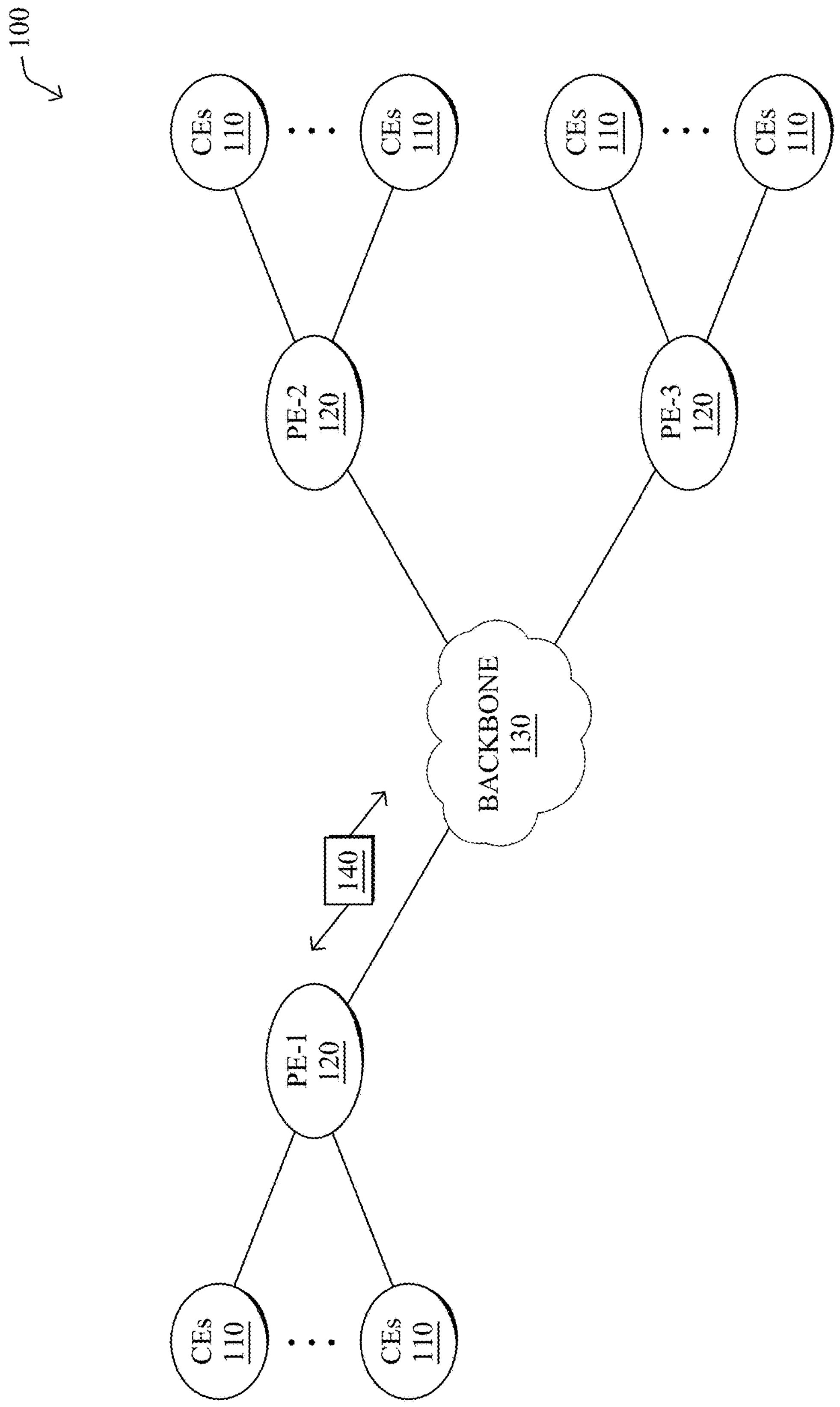
FIGS. 1A-1B illustrate an example computer network.

According to one or more embodiments of the disclosure, a device makes an inference about an event indicated by sensor data from a plurality of sources by applying a semantic reasoning engine to the sensor data. The device receives a selected semantic compression level from a user interface. The device selects a subset of the sensor data based on the inference and on the selected semantic compression level. The device exports the subset of the sensor data and the inference made by the semantic reasoning engine about the event.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
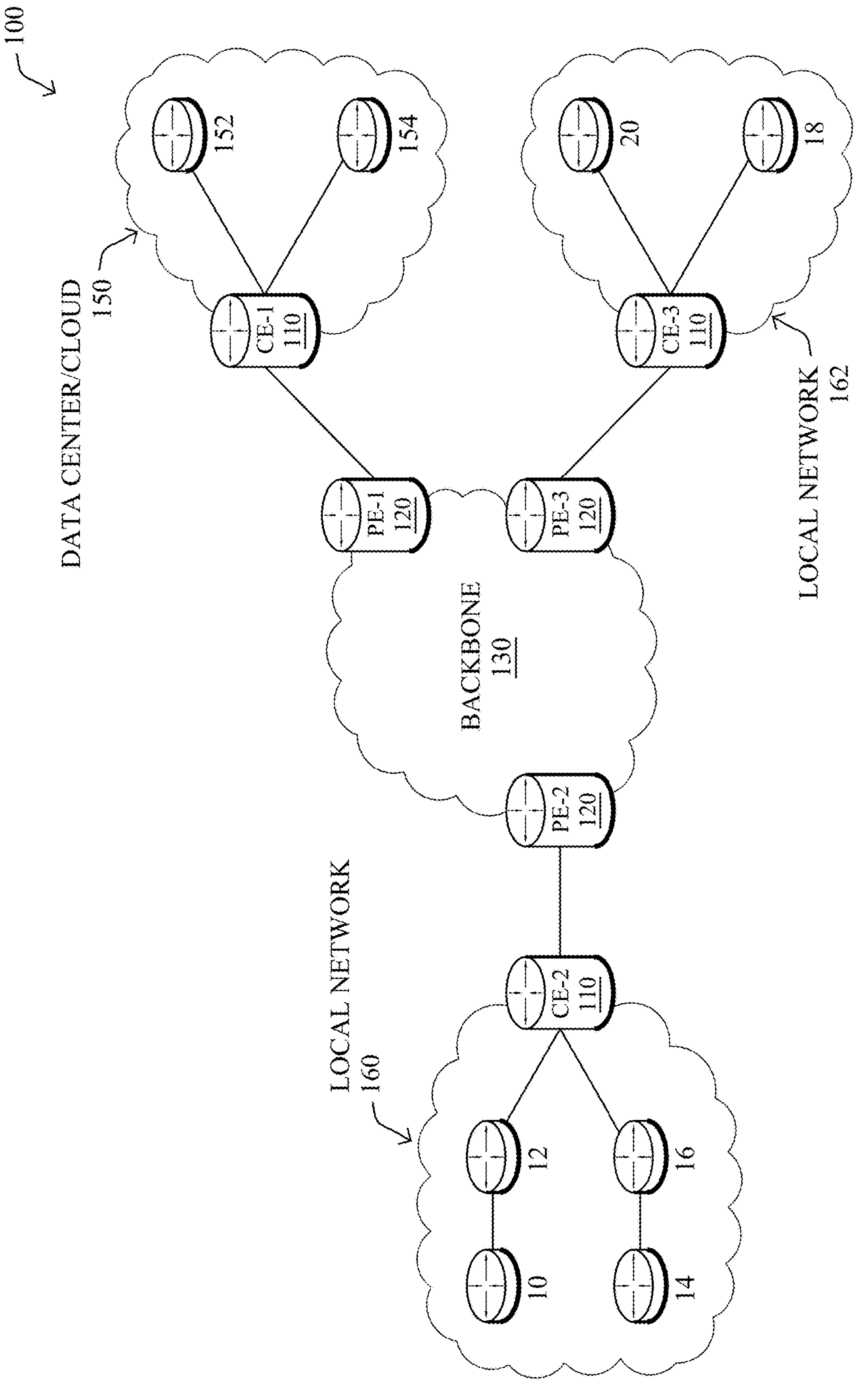

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
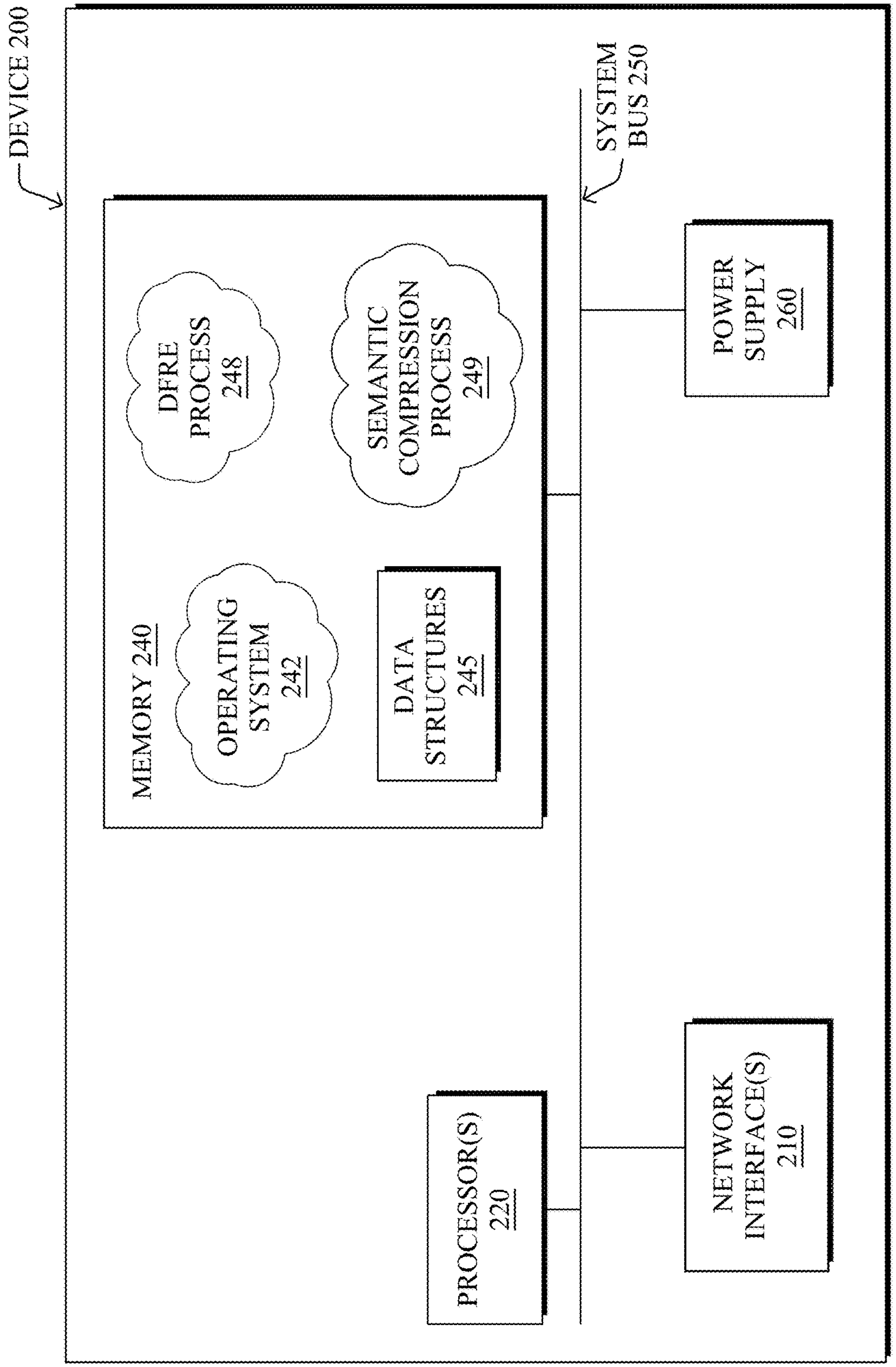
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248 and/or a semantic compression process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide cognitive reasoning services to a network. In various embodiments, DFRE process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
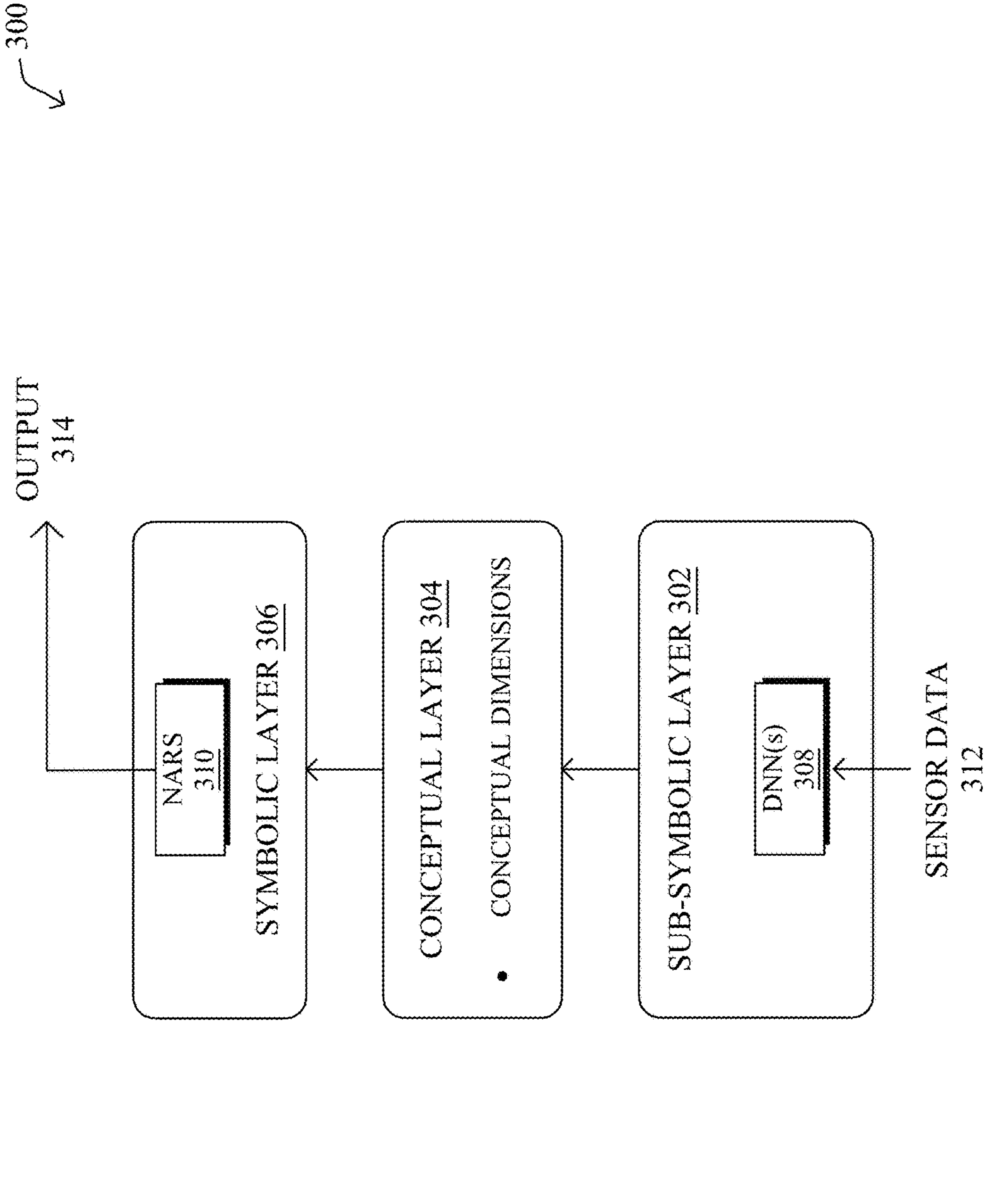
FIG. 3 illustrates an example hierarchy for a deep fusion reasoning engine (DFRE)

According to various embodiments, FIG. 3 illustrates an example hierarchy 300 for a deep fusion reasoning engine (DFRE). For example, DFRE process 248 shown in FIG. 2 may execute a DFRE for any number of purposes. In particular, DFRE process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a DFRE is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

In other words, a DFRE generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 4:
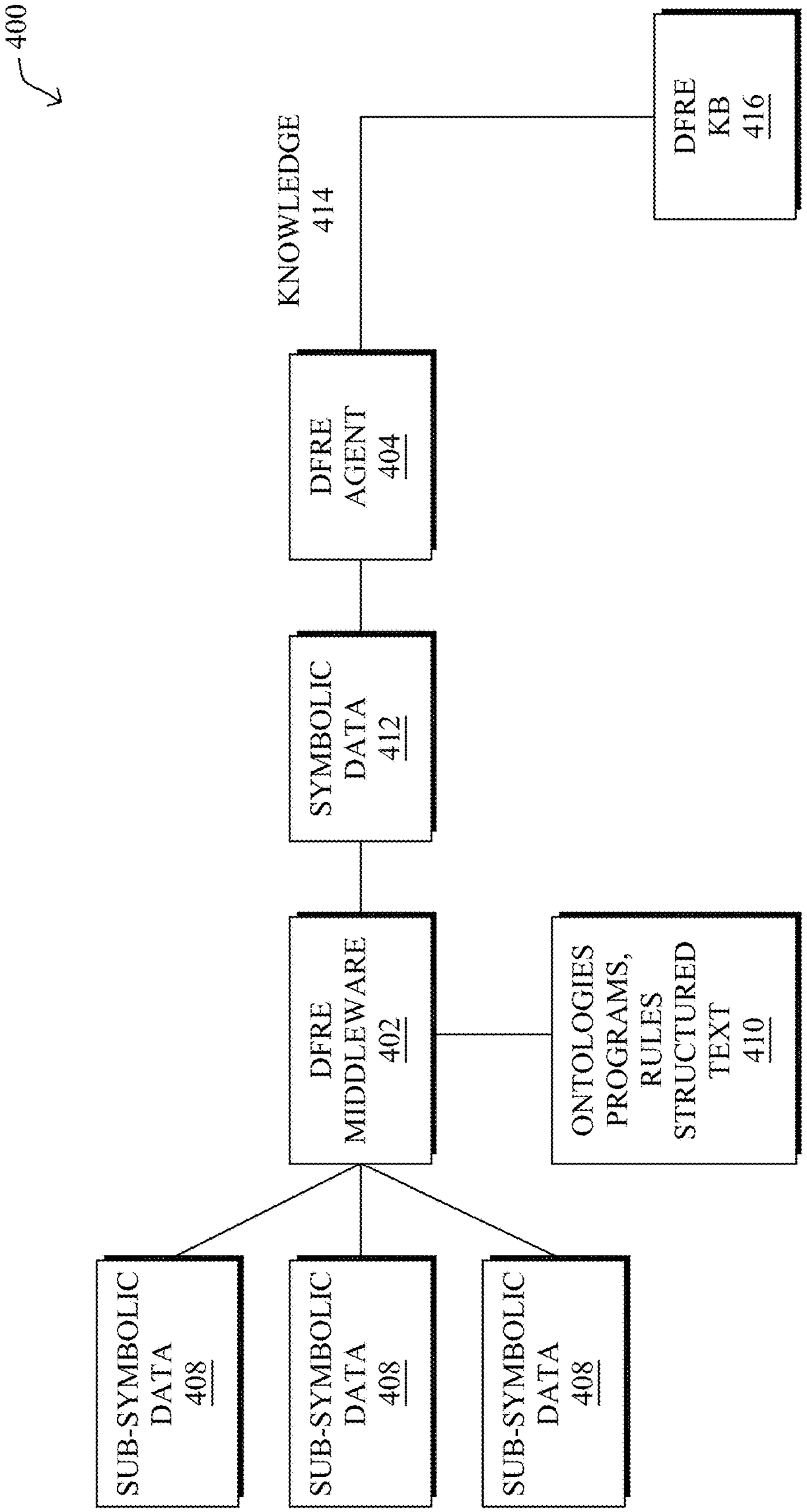
FIG. 4 illustrates an example DFRE architecture.

According to various embodiments, FIG. 4 illustrates an example DFRE architecture 400. As shown, architecture 400 may be implemented across any number of devices or fully on a particular device, as desired. At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In various embodiments, DFRE middleware 402 may also provide services to support semantic reasoning, such as by an AIKR reasoner. For example, as shown, DFRE middleware 402 may include a NARS agent that performs semantic reasoning for structural learning. In other embodiments, OpenCog or another suitable AIKR semantic reasoner could be used.

One or more DFRE agents 404 may interface with DFRE middleware 402 to orchestrate the various services available from DFRE middleware 402. In addition, DFRE agent 404 may feed and interact with the AIKR reasoner so as to populate and leverage a DFRE knowledge graph with knowledge.

More specifically, in various embodiments, DFRE middleware 402 may obtain sub-symbolic data 408. In turn, DFRE middleware 402 may leverage various ontologies, programs, rules, and/or structured text 410 to translate sub-symbolic data 408 into symbolic data 412 for consumption by DFRE agent 404. This allows DFRE agent 404 to apply symbolic reasoning to symbolic data 412, to populate and update a DFRE knowledge base (KB) 416 with knowledge 414 regarding the problem space (e.g., the network under observation, etc.). In addition, DFRE agent 404 can leverage the stored knowledge 414 in DFRE KB 416 to make assessments/inferences.

For example, DFRE agent 404 may perform semantic graph decomposition on DFRE KB 416 (e.g., a knowledge graph), so as to compute a graph from the knowledge graph of KB 416 that addresses a particular problem. DFRE agent 404 may also perform post-processing on DFRE KB 416, such as performing graph cleanup, applying deterministic rules and logic to the graph, and the like. DFRE agent 404 may further employ a definition of done, to check goals and collect answers using DFRE KB 416.

In general, DFRE KB 416 may comprise any or all of the following:

- Data
- Ontologies
- Evolutionary steps of reasoning
- Knowledge (e.g., in the form of a knowledge graph)
- The Knowledge graph also allows different reasoners to:
  - Have their internal subgraphs
  - Share or coalesce knowledge
  - Work cooperatively In other words, DFRE KB 416 acts as a dynamic and generic memory structure. In some embodiments, DFRE KB 416 may also allow different reasoners to share or coalesce knowledge, have their own internal sub-graphs, and/or work collaboratively in a distributed manner. For example, a first DFRE agent 404 may perform reasoning on a first sub-graph, a second DFRE agent 404 may perform reasoning on a second sub-graph, etc., to evaluate the health of the network and/or find solutions to any detected problems. To communicate with DFRE agent 404, DFRE KB 416 may include a bidirectional Narsese interface or other interface using another suitable grammar.

In various embodiments, DFRE KB 416 can be visualized on a user interface. For example, Cytoscape, which has its building blocks in bioinformatics and genomics, can be used to implement graph analytics and visualizations.

Said differently, DFRE architecture 400 may include any or all of the following the following components:

- DFRE middleware 402 that comprises:
  - Structural learning component
  - JSON, textual data, ML/DL pipelines, and/or other containerized services (e.g., using Docker)
  - Hierarchical goal support
- DFRE Knowledge Base (KB) 416 that supports:
  - Bidirectional Narseseese interface
  - Semantic graph decomposition algorithms
  - Graph analytics
  - Visualization services
- DFRE Agent 404
  - DFRE Control System More specifically, in some embodiments, DFRE middleware 402 may include any or all of the following:

- Subsymbolic services:
  - Data services to collect sub-symbolic data for consumption
- Reasoner(s) for structural learning
- NARS
- OpenCog
- Optimized hierarchical goal execution
  - Probabilistic programming
  - Causal inference engines
- Visualization Services (e.g., Cytoscape, etc.)

DFRE middleware 402 may also allow the addition of new services needed by different problem domains.

During execution, DFRE agent 404 may, thus, perform any or all of the following:

- Orchestration of services
- Focus of attention
  - Semantic graph decomposition
    - Addresses combinatorial issues via an automated divide and conquer approach that works even in non-separable problems because the overall knowledge graph 416 may allow for overlap.

Feeding and interacting with the AIKR reasoner via bidirectional translation layer to the DFRE knowledge graph.

Call middleware services

Post processing of the graph

Graph clean-up

Apply deterministic rules and logic to the graph

Definition of Done (DoD)

Check goals and collect answers

Figure 5:
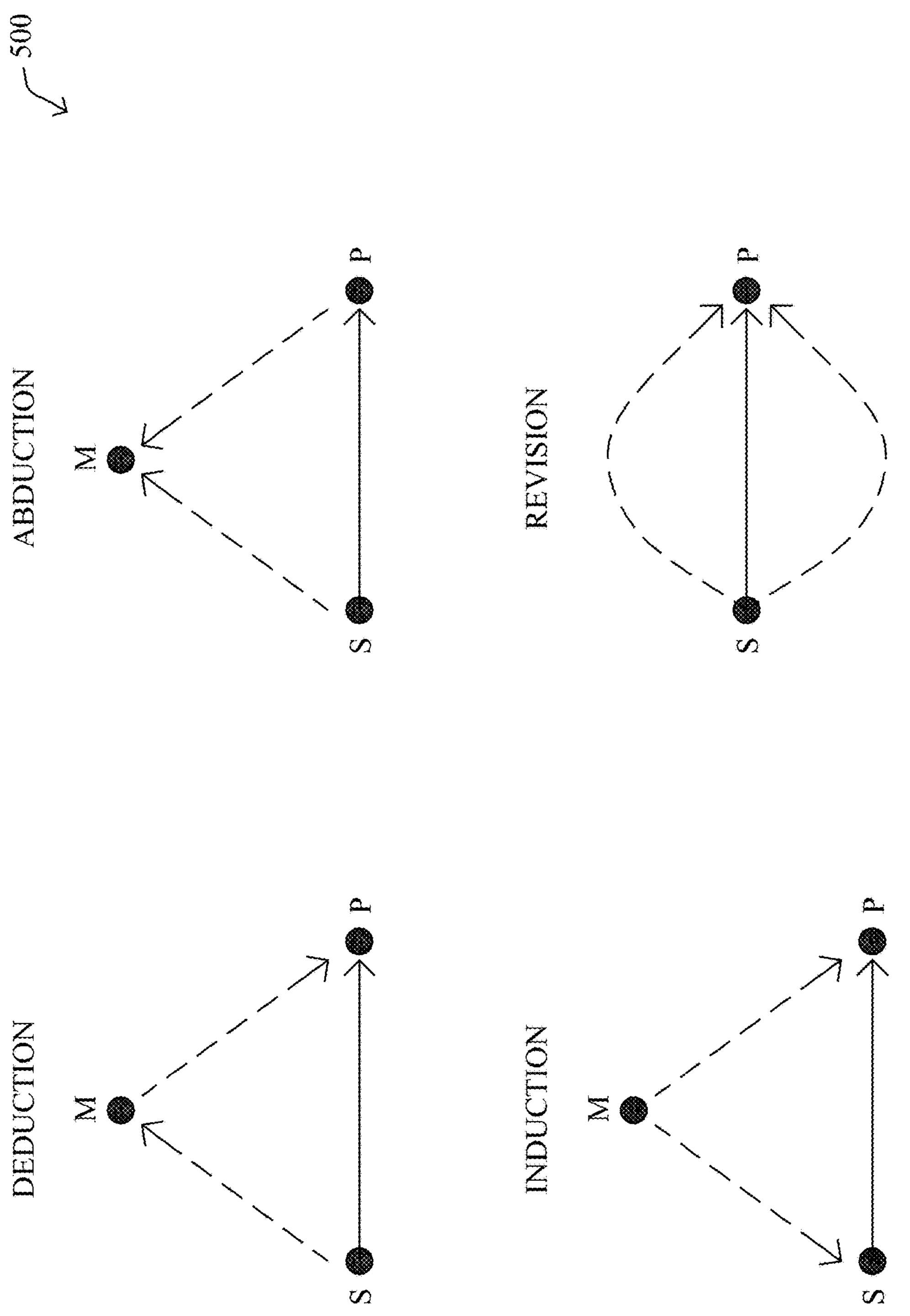
FIG. 5 illustrates an example of various inference types.

FIG. 5 illustrates an example 500 showing the different forms of structural learning that the DFRE framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the DFRE may support any or all of the following:

Syllogistic Logic

Logical quantifiers

Various Reasoning Types

Deduction Induction

Abduction

Induction

Revision

Different Types of Inference

Local inference

Backward inference

Figure 6:
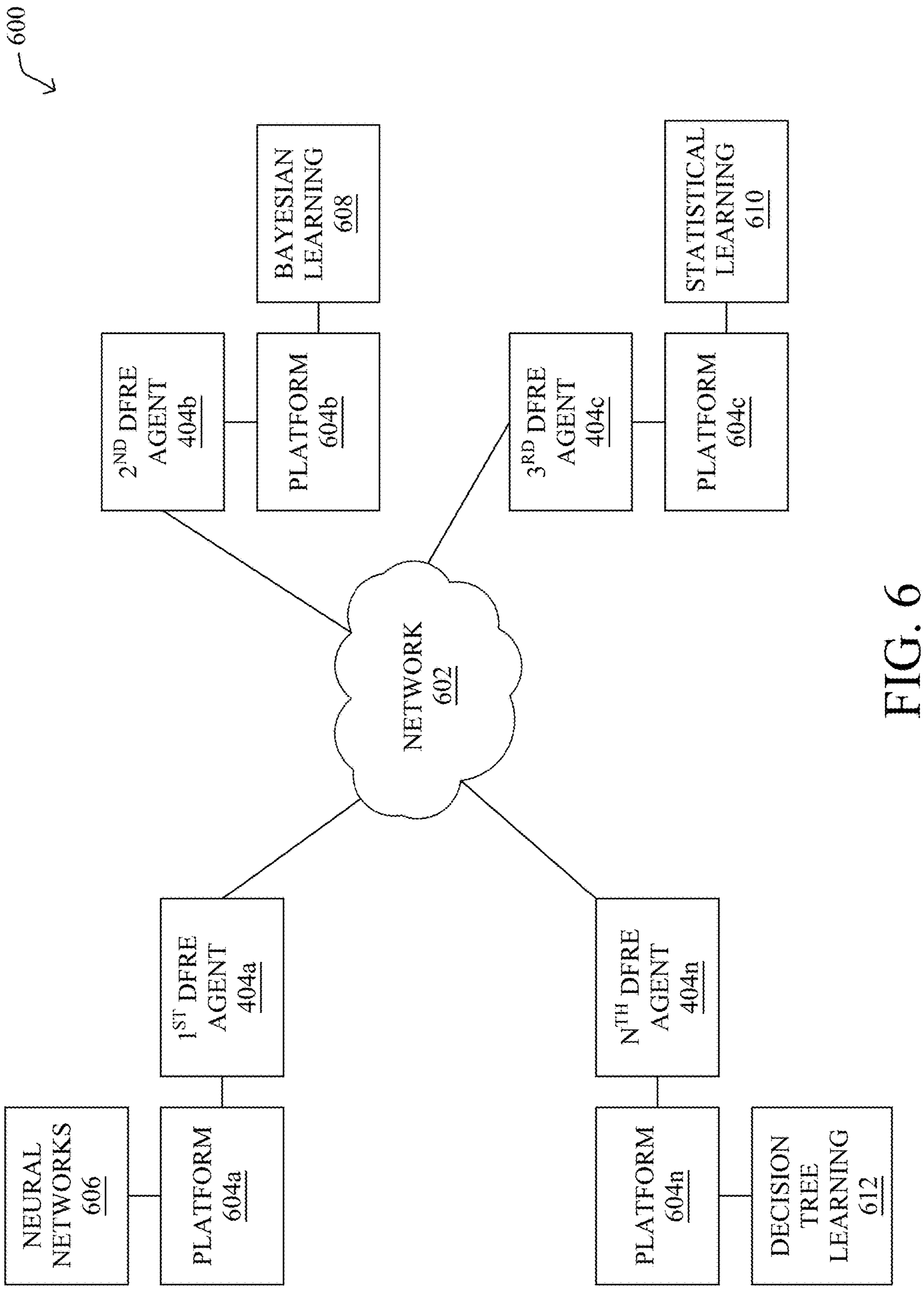
FIG. 6 illustrates an example architecture for multiple DFRE agents.

To address combinatorial explosion, the DFRE knowledge graph may be partitioned such that each partition is processed by one or more DFRE agents 404, as shown in FIG. 6, in some embodiments. More specifically, any number of DFRE agents 404 (e.g., a first DFRE agent 404*a* through an $N^{th}$ DFRE agent 404*n*) may be executed by devices connected via a network 602 or by the same device. In some embodiments, DFRE agents 404*a*-404*n* may be deployed to different platforms (e.g., platforms 604*a*-604*n*) and/or utilize different learning approaches. For instance, DFRE agent 404*a* may leverage neural networks 606, DFRE agent 404*b* may leverage Bayesian learning 608, DFRE agent 404*c* may leverage statistical learning, and DFRE agent 404*n* may leverage decision tree learning 612.

As would be appreciated, graph decomposition can be based on any or all of the following:

Spatial relations—for instance, this could include the vertical industry of a customer, physical location (country) of a network, scale of a network deployment, or the like.

Descriptive properties, such as severity, service impact, next step, etc.

Graph-based components (isolated subgraphs, minimum spanning trees, all shortest paths, strongly connected components . . . )

Any new knowledge and related reasoning steps can also be input back to the knowledge graph, in various embodiments.

In further embodiments, the DFRE framework may also support various user interface functions, so as to provide visualizations, actions, etc. to the user. To do so, the framework may leverage Cytoscape, web services, or any other suitable mechanism.

Figure 7:
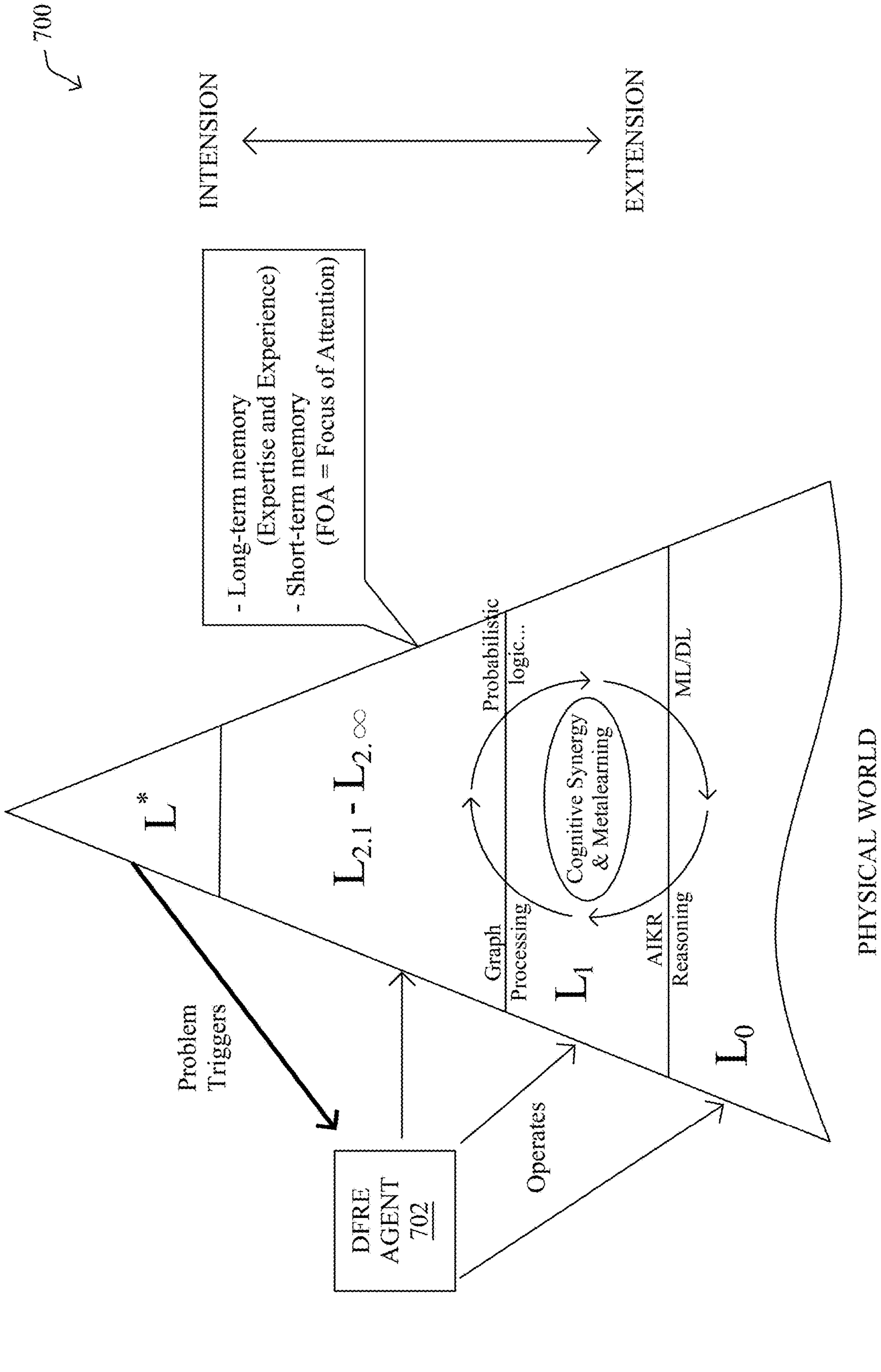
FIG. 7 illustrates an example DFRE metamodel.

At the core of the techniques herein is a knowledge representation metamodel 700 for different levels of abstraction, as shown in FIG. 7, according to various embodiments. In various embodiments, the DFRE knowledge graph groups information into four different levels, which are labeled $L_0$, $L_1$, $L_2$, and L* and represent different levels of abstraction, with $L_0$ being closest to raw data coming in from various sensors and external systems and $L_2$ representing the highest levels of abstraction typically obtained via mathematical means such as statistical learning and reasoning. L* can be viewed as the layer where high-level goals and motivations are stored. The overall structure of this knowledge is also based on anti-symmetric and symmetric relations.

One key advantage of the DFRE knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:

L* represents the overall status of the abstraction. In case of a problem, it triggers problem solving in lower layers via a DFRE agent 702.

$L_{2.1}$-$L_{2.\infty}$=Higher level representations of the world in which most of concepts and relations are collapsed into simpler representations. The higher-level representations are domain-specific representations of lower levels.

$L_1$=has descriptive, teleological and structural information about $L^0$.

$L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at L*, a DFRE agent 702 that operates on $L_2$-$L_0$ may control the FOA so as to focus on different things, in some embodiments.

As would be appreciated, there may be hundreds of thousands or even millions of data points that need to be extracted at $L_0$. The DFRE's FOA is based on the abstraction and the DFRE knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), DFRE agent 702 can make evaluations regarding the particular system at different levels of extraction. Indeed, metamodel 700 may differ from a more traditional knowledge graph through the inclusion of any or all of the following, in various embodiments:

A formal mechanism to represent different levels of abstraction, and for moving up and down the abstraction hierarchy (e.g., ranging from extension to intension).

Additional structure that leverages distinctions/anti-symmetric relations, as the backbone of the knowledge structures.

Similarity/symmetric relation-based relations.

As noted above, the amount of data that needs to be stored in the data lake for a system that assesses multimodal timeseries data can grow to be quite large. For instance, the various sensors on board a ship can easily generate data exceeding 50 petabytes, or more, over a relatively limited amount of time. A key observation is that the sensor data for many events are extremely similar to one another, leading to the potential to compress the data lake. For instance, consider an event associated with people crowded on the deck of the ship. Here, there may be dozens of video feeds of this event at different angles, microphone data from various locations, etc. However, it is not really necessary to present an administrator with all of this sensor data, to convey information about the event to them. Indeed, the administrator may only need to review highlights of events for a given time period (e.g., representative video frames that summarize the events).

Semantic Compression in a Sensor System

The techniques herein introduce a semantic compression mechanism that allows for the compression of multimodal sensor/time series data through the identification of similar event or activity patterns in the data. This allows for events to be summarized automatically by the system, thereby reducing the overall dataset needed to describe the events. In further aspects, the techniques herein can also be used to label unknown events or activities by asking a user to label a summary set of data.

Illustratively, the techniques described herein may be performed by hardware, software, and/or firmware, such as in accordance with the semantic compression process 249, which may include computer executable instructions executed by the processor 220 (or independent processor of interfaces 210), to perform functions relating to the techniques described herein, such as in conjunction with DFRE process 248.

Specifically, according to various embodiments, a device makes an inference about an event indicated by sensor data from a plurality of sources by applying a semantic reasoning engine to the sensor data. The device receives a selected semantic compression level from a user interface. The device selects a subset of the sensor data based on the inference and on the selected semantic compression level. The device exports the subset of the sensor data and the inference made by the semantic reasoning engine about the event.

Operationally, according to various embodiments, the techniques herein introduce the concept of semantic compression that allows the system to identify similar data according to their semantic information and leverage this to compress the full dataset from the sensors. For instance, consider an event whereby one ship is approaching another. In such a case, it may not be necessary to supply the reviewer with the full set of sensor data, to convey information about the event. Indeed, this may be a relatively regular and benign occurrence during which the approaching ship then passes the other ship. In such a case, the system can simply summarize this event, which can greatly reduce the amount of data that needs to be exported regarding the event.

Figure 8:
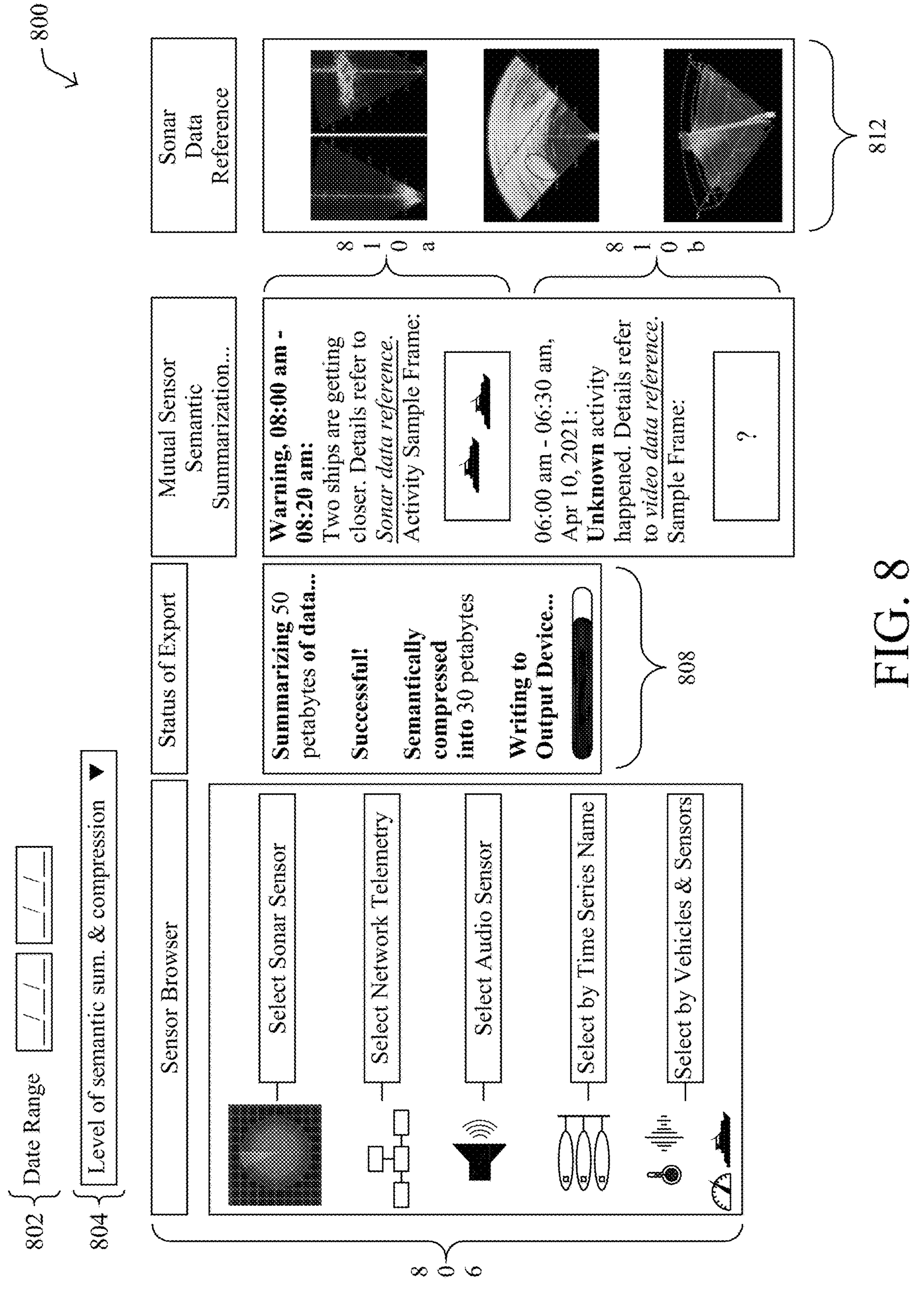
FIG. 8 illustrates an example user interface for performing semantic compression.

FIG. 8 illustrates an example user interface 800 for performing semantic compression, according to various embodiments. Assume, for instance, that a particular device receives sensor data from a plurality of different sensors in a sensor network. The device may then analyze the sensor data using a semantic reasoning engine, such as in accordance with the metamodel described previously with respect to FIG. 7. Notably, the metamodel of DFRE process 248 may detect the occurrence of an event and use semantic reasoning to make inferences about it.

In various embodiments, the through execution of semantic compression process 249, may present a user with user interface 800, to control the semantic compression applied to the set of sensor data analyzed by the semantic reasoning engine. For instance, assume that the sensors include any or all of the following: sonar sensors, audio sensors, video, network telemetry, or the like, that are used on board a ship to monitor the conditions of the ship.

As shown, user interface 800 may include a date or time range input 802 that allows the user to select a particular date or time range. This signifies the temporal bounds for the set of sensor data to be compressed. For instance, the user may select the past week via input 802, indicating that the sensor data from the past week, as well as any inferences made about that data, should be compressed for export.

In various embodiments, user interface 800 may also include an input 804 that allows its user to specify a level of semantic compression that should be applied to the sensor data from the range specified via date or time range input 802. For instance, input 804 may allow the user to specify certain types of inferences by the semantic reasoning engine that can be compressed. Indeed, certain types of events may be routine or benign that often have very similar associated sensor data (e.g., a camera feed of an empty hallway, etc.).

Input 806 of user interface 800 may allow the user to specify which types of sensor data should be included for the compression level specified via input 804, in some embodiments. For instance, the user of user interface 800 may specify that sonar data, audio data, video data, temperature data, humidity data, network telemetry data, vibration data, or other forms of sensor data, may be eligible for semantic compression by the system, in accordance with the level of compression specified via input 804. Conversely, the user of user interface 800 may also specify via input 806 that certain types of sensor data should never be compressed by the system, such as when an event represents a certain type of hazardous condition or the like.

In some embodiments, user interface 800 may include indicia 808 that indicates the status of any semantically compressed data for export. For instance, indicia 808 may display the original size of the sensor data being compressed, as well as the size of the compressed data. Indicia 808 may also indicate the status of the transfer of any exported data to another device.

In one embodiment, user interface 800 may further include summarizations 810 for the various events detected by the semantic reasoning engine of the system. For instance, summarization 810*a* may indicate a warning event whereby two ships are within a certain distance of one another, as well as timestamp information for the event. In addition, summarization 810*a* may include a sample frame indicating the relative locations of the ships. Similarly, summarization 810*b* may indicate the occurrence of an event of an unknown type, along with timestamp information and a sample video frame.

A further potential component of user interface 800 may be sensor data 812 that serves as a reference for any given event. For instance, associated with the event of summarization 810*a* may also be sensor data 812 that serves as a reference for a detected event (e.g., reference sonar data showing the passing of two ships).

As would be appreciated, the semantic compression provided by the system differs from traditional compression techniques. More specifically, traditional compression techniques seek to reduce the number of bits/bytes of the data itself, such as by replacing repeating bits of a file with an index value. Semantic compression, in contrast, seeks to reduce the size of a dataset according to the semantic importance of the events associated with the various data in the dataset. For instance, consider the case of two video feeds, one of which shows a critical event (e.g., a traffic accident at an intersection) and the other showing a benign event (e.g., cars crossing the intersection without incident). Application of a traditional compression technique to these video feeds would reduce both files by approximately the same percentage, depending on the compression algorithm used. In contrast, the semantic compression techniques herein may opt to include the entirety of the first video feed for export, while selecting only a single frame of the latter feed for export. Accordingly, in some embodiments, traditional compression may still be used in conjunction with the semantic compression techniques herein, to further reduce the exported datasets.

Figure 9:
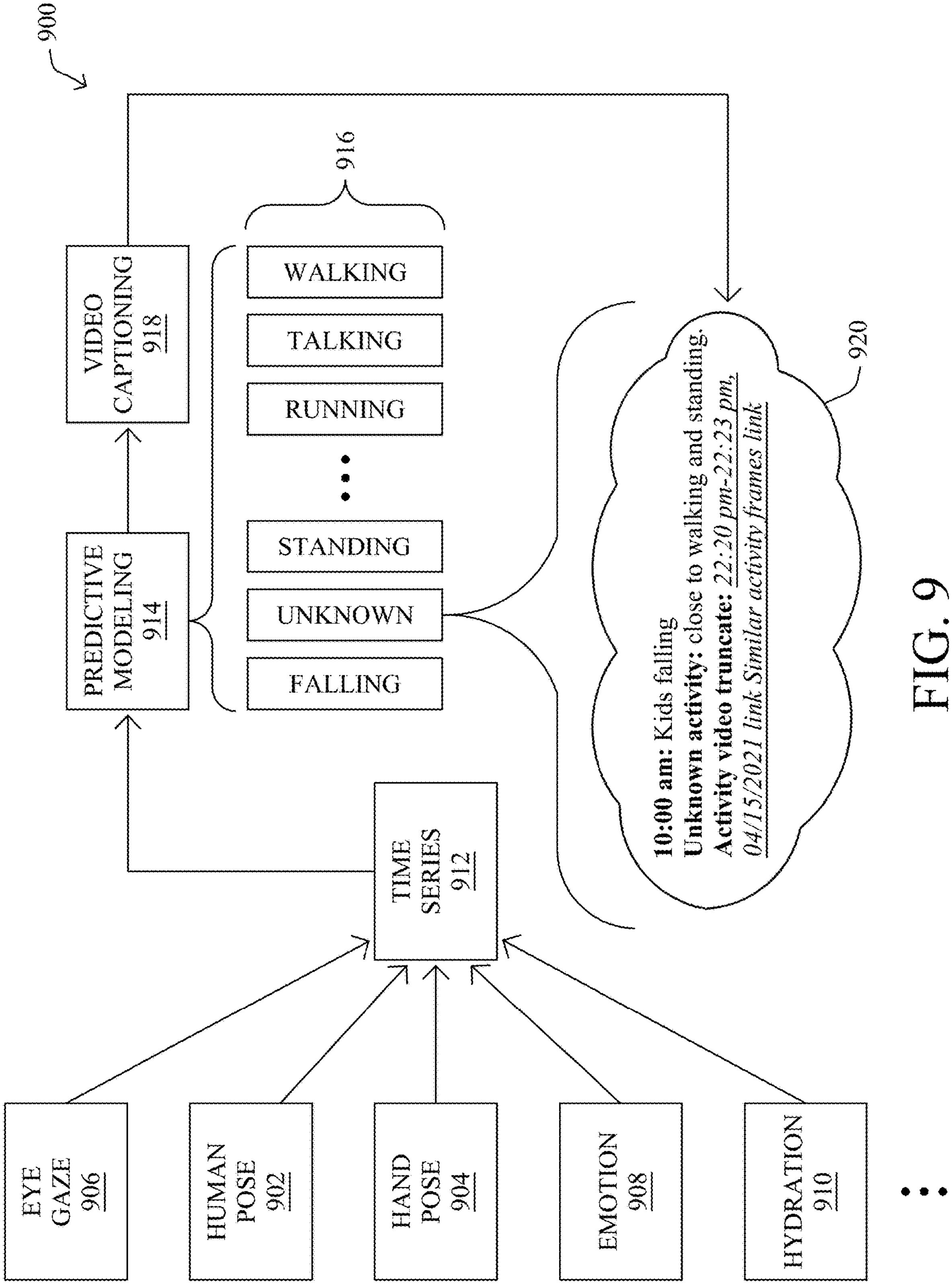
FIG. 9 illustrates an example of the assessment of an unknown event type.

FIG. 9 illustrates an example 900 of the assessment of an unknown event type, according to various embodiments. As shown, assume now that the underlying sensor system is primarily concerned with assessing the behaviors of humans in the environment to which the sensor system s deployed (e.g., an airport, a sports arena, etc.). For instance, the sensor system may capture sensor data indicative of human poses 902, hand poses 904, eye gazes 906, predicted emotions 908, hydration 910, etc. All of this information may form time series 912 that is then assessed by the semantic reasoning engine 914 of the system.

Through its analysis of time series 912, semantic reasoning engine 914 may identify any number of events 916. For instance, in the case of assessing the activities of people in the area, these events/activities may include falling, standing, running, talking, walking, etc. In doing so, semantic reasoning engine 914 may also generate captioning 918 that help summarize the time series 912, such as text-based summaries of the events depicted in a video stream. In turn, the system may output a timeline 920 that summarizes the various events 916 detected by the system over time. In various embodiments, the system may also apply semantic compression to the sensor data surrounding the various events, based on inferences made by semantic reasoning engine 914 about events 916, to provide selected sensor data as part of timeline 920.

According to various embodiments, semantic reasoning engine 914 may also be configured to provide information about events that it detects that are of an unknown type, so that a user can provide a label for that type of event. For instance, consider the case of 'falling' being an unknown type of event to semantic reasoning engine 914, but that semantic reasoning engine 914 has already learned the concepts of 'walking' and 'standing.' In such a case, the system may include a request as part of timeline 920 to a user interface for the user to provide a label for this type of event/activity. In conjunction with this request, the system may also provide semantically compressed sensor data surrounding this event, to provide some additional context to the labeling user (e.g., a short video of the activity). In other words, the semantic compression introduced herein is not limited to simply compressing a data lake for export, but can also be leveraged to facilitate the learning and labeling of new events, as well, without overwhelming the user.

Figure 10:
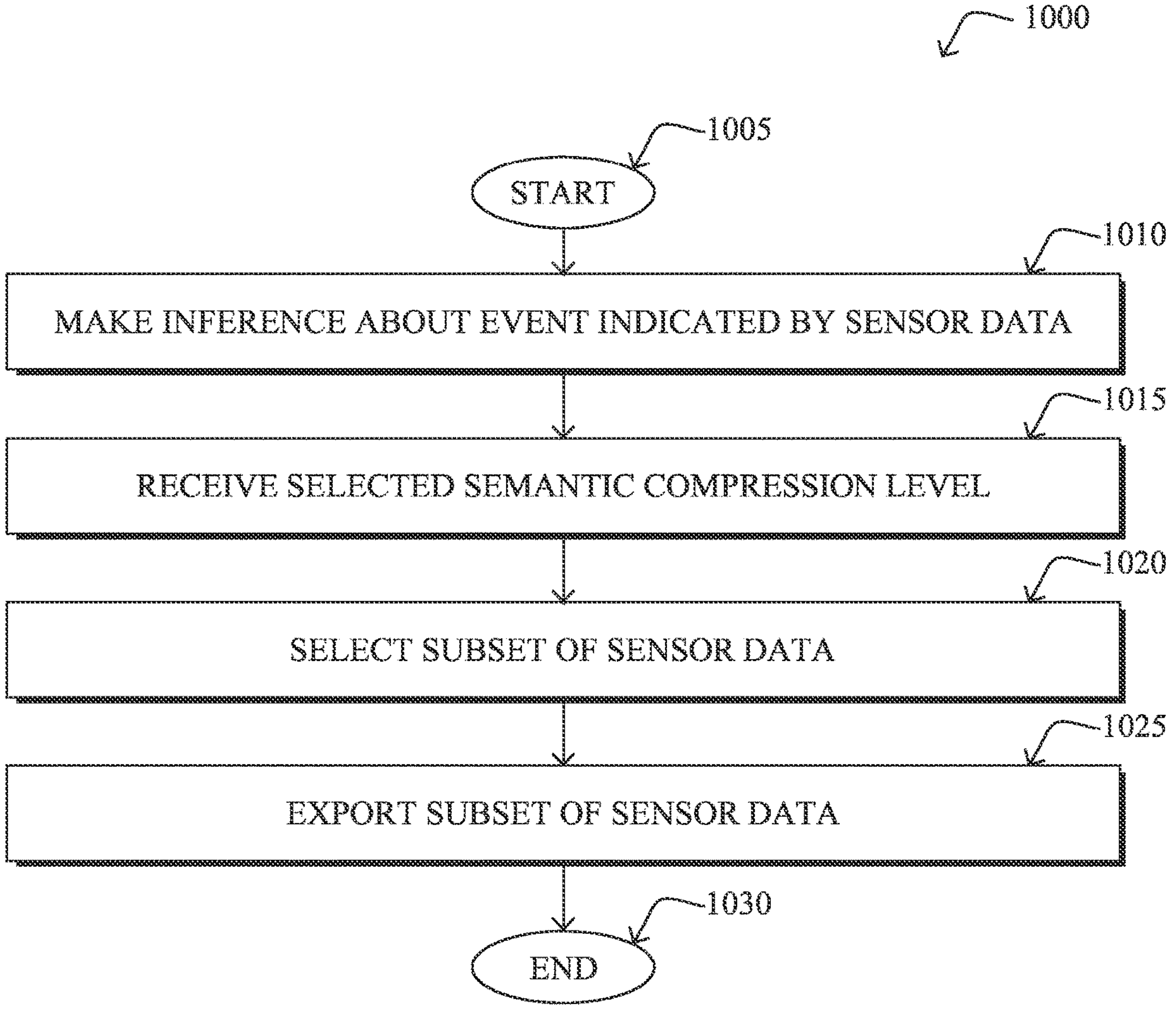
FIG. 10 illustrates an example simplified procedure for using a DFRE with a visual programming environment.

FIG. 10 illustrates an example simplified procedure 1000 (e.g., a method) for applying semantic compression to sensor data, in accordance with one or more embodiments described herein. For example, a non-generic, specifically configured device (e.g., device 200) may perform procedure 1000 by executing stored instructions (e.g., DFRE process 248 and/or semantic compression process 249). The procedure 1000 may start at step 1005, and continues to step 1010, where, as described in greater detail above, the device may make an inference about an event indicated by sensor data from a plurality of sources by applying a semantic reasoning engine to the sensor data. In various embodiments, the sensor data may comprise time series data, such as from a video feed, sonar data over the course of time, or the like. In some embodiments, the semantic reasoning engine may use a knowledge graph comprising concepts, to make the inference about the event.

At step 1015, as detailed above, the device may receive a selected semantic compression level from a user interface. In general, the semantic compression level may indicate the amount of sensor data associated with a particular event that should be exported.

At step 1020, the device may select a subset of the sensor data based on the inference and on the selected semantic compression level, as described in greater detail above. For instance, the selected semantic compression level may specify that benign or routine events only require a subset of their associated sensor data (e.g., a sample video frame or clip, etc.). In some instances, the inference may be that the event is of an unknown type. In turn, the device may also provide the subset of the sensor data to the user interface for labeling.

At step 1025, as detailed above, the device may export the subset of the sensor data and the inference made by the semantic reasoning engine about the event. Indeed, by reducing the sensor datasets for certain detected events, the amount of data can be significantly reduced for export to another device. For instance, the device may upload the exported data to the cloud, a specified server, another device, or the like. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, introduce semantic compression techniques that can be used to summarize events detected using multimodal sensor data. In some aspects, the amount of compression applied for a given event may be user-specified and depend in part on any inferences made about the event by a semantic reasoning engine.

While there have been shown and described illustrative embodiments that provide for semantic compression, it is to be understood that various other adaptations and modifications may be made within the spirit and scope of the embodiments herein. For example, while certain embodiments are described herein with respect to specific types of sensor systems, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, by a device, sensor data from a plurality of sensors monitoring conditions on board a ship, the sensor data comprising sonar data and at least one of video data, audio data, or network telemetry data;

making, by a device, an inference about an event indicated by the sensor data by applying a semantic reasoning engine to the sensor data, wherein the sensor data comprises time series data, further wherein the semantic reasoning engine uses a hierarchical knowledge graph, comprising multiple layers ranging from concepts at a highest layer and raw sensor measurements from the plurality of sensors at a lowest layer, to make the inference about the event;

receiving, at the device and from a user interface, a selected date or time range, a selected semantic compression level, and an indication of which types of the sensor data are eligible for semantic compression that narrows the sensor data by time and type;

selecting, by the device and based on the inference, the selected semantic compression level, and the indication of which types of the sensor data are eligible for semantic compression, a subset of the sensor data associated with the event and within the selected date or time range, wherein the subset of the sensor data comprises the sonar data and at least one of the video data, audio data, or network telemetry data; and exporting, from the device, the subset of the sensor data and the inference made by the semantic reasoning engine about the event.

2. The method as in claim 1, wherein the subset of the sensor data comprises a video frame.

3. The method as in claim 1, wherein the inference indicates that the event is a benign event.

4. The method as in claim 1, wherein the event corresponds to an activity by a person.

5. The method as in claim 1, wherein the inference is that the event is of an unknown type.

6. The method as in claim 5, further comprising:

providing the subset of the sensor data as semantically compressed context to the user interface for labeling when the inference indicates that the event is of the unknown type.

7. The method as in claim 1, wherein the inference indicates that the event represents a hazardous condition.

8. The method as in claim 1, wherein selecting the subset of the sensor data comprises excluding at least one type of the sensor data from semantic compression based on an indication, received from the user interface, that the at least one type of the sensor data is not eligible for semantic compression.

9. The method as in claim 1, further comprising:

generating, by the semantic reasoning engine, captioning summarizing detected events, and providing the captioning with the subset of the sensor data and the inference.

10. The method of claim 1, wherein selecting the subset of sensor data comprises retaining a first amount of sensor data when the inference indicates a first event type and retaining a second, different amount of sensor data when the inference indicates a second event type.

11. The method as in claim 1, wherein the subset of the sensor data comprises reference sensor data that serves as a reference for the event.

12. The method as in claim 1, wherein the subset of the sensor data is selected from sensor data occurring within a temporal window surrounding the event.

13. An apparatus, comprising:

a network interface to communicate with a computer network;

a processor coupled to the network interface and configured to execute one or more processes; and a memory configured to store a process that is executed by the processor, the process when executed configured to:

make an inference about an event indicated by sensor data from a plurality of sources having differing sensing modalities monitoring conditions in an environment by applying a semantic reasoning engine to the sensor data, wherein the sensor data from the plurality of sources comprises time series data, further wherein the semantic reasoning engine uses a hierarchical knowledge graph, comprising multiple layers ranging from concepts at a highest layer and raw sensor measurements from a plurality of sources at a lowest layer, to make the inference about the event;

determine that the inference is that the event is of an unknown type;

receive, from a user interface, a selected semantic compression level and an indication of which types of the sensor data are eligible for semantic compression;

select, based on the inference, the selected semantic compression level, and the indication of which types of the sensor data are eligible for semantic compression, a subset of sensor data surrounding the event, the subset comprising a semantically compressed subset of the sensor data surrounding the event; and provide, to a user interface, the semantically compressed subset of the sensor data for labeling of the unknown type of event.

14. The apparatus as in claim 13, wherein the semantically compressed subset of the sensor data comprises a truncated temporal segment of a larger video associated with the unknown type of event, a remainder of the larger video being excluded from the semantically compressed subset of the sensor data.

15. The apparatus as in claim 14, further comprising:

providing, to the user interface, a link associated with the truncated temporal segment to video frames identified as including activity similar to activity in the truncated temporal segment.

16. The apparatus as in claim 13, wherein the event corresponds to an activity by a person.

17. The apparatus as in claim 13, wherein the semantically compressed subset of sensor data surrounding the event is selected for inclusion based on having occurred within a temporal window surrounding the event.

18. The apparatus as in claim 13, further comprising:

generating, by the semantic reasoning engine, captioning summarizing detected events; and providing the captioning summarizing the detected events to the user interface with the semantically compressed subset of the sensor data for labeling of the unknown type of event.

19. The apparatus as in claim 13, wherein the semantically compressed subset of the sensor data is provided to the user interface as part of a timeline of detected events for identification of the unknown event.

20. A tangible, non-transitory, computer-readable medium storing program instructions that cause a device to execute a process comprising:

making, by the device, an inference about an event indicated by sensor data from a plurality of sources by applying a semantic reasoning engine to the sensor data, wherein the sensor data from the plurality of sources comprises time series data, further wherein the semantic reasoning engine uses a hierarchical knowledge graph, comprising multiple layers ranging from concepts at a highest layer and raw sensor measurements from a plurality of sources at a lowest layer, to make the inference about the event;

receiving, at the device and from a user interface, a selected semantic compression level, a selected date or time range within which the sensor data was collected, and an indication of which types of the sensor data are eligible for semantic compression, that narrows the sensor data from the plurality of sources by time and type;

selecting, by the device and based on the inference, the selected semantic compression level, the selected date or time range, and the indication of which types of the sensor data are eligible for semantic compression, a subset of the sensor data associated with the event and collected within the date or time range, wherein the subset of the sensor data comprises a representative frame or clip selected from a larger video when the inference indicates the event is associated with benign conditions and comprises a greater amount of event-associated sensor data when the inference indicates the event is associated with a hazardous condition; and exporting, from the device, the subset of the sensor data and the inference made by the semantic reasoning engine about the event.

* * * * *